United States Patent

Harvey

[11] Patent Number: 4,721,973
[45] Date of Patent: Jan. 26, 1988

[54] CAMERA WITH FILM TAKE-UP CONFIRMING MECHANISM

[75] Inventor: Donald M. Harvey, Webster, N.Y.

[73] Assignee: Eastman Kodak Company, Rochester, N.Y.

[21] Appl. No.: 2,470

[22] Filed: Jan. 12, 1987

[51] Int. Cl.⁴ .................. G03B 1/04; G03B 17/18; G03B 17/38
[52] U.S. Cl. ................... 354/215; 354/212; 354/268; 354/289.1
[58] Field of Search ............. 354/207, 215, 217, 268, 354/289.1, 213, 212, 266

[56] References Cited

U.S. PATENT DOCUMENTS

| | | | |
|---|---|---|---|
| 3,470,799 | 1/1965 | Englemann | 352/72 |
| 3,608,459 | 9/1971 | Ettischer et al. | 354/207 |
| 3,665,830 | 5/1972 | Maeda | 354/213 |
| 4,174,168 | 11/1979 | Yamashita | 354/207 |
| 4,334,753 | 6/1982 | Harvey | 354/289.1 |
| 4,340,291 | 7/1982 | Berg | 354/215 |
| 4,344,753 | 8/1987 | Shelley et al. | 432/3 |

Primary Examiner—A. A. Mathews
Attorney, Agent, or Firm—Roger A. Fields

[57] ABSTRACT

A photographic camera, when loaded with a film cartridge containing a perforated filmstrip, warns the user of a film take-up malfunction by preventing manual actuation of the shutter release and, when not loaded with the cartridge, permits manual actuation of the shutter release to test-operate the camera. In the camera, a blocking member is urged to move from a non-blocking position with respect to a shutter release to a blocking position preventing manual actuation of the shutter release. A cartridge sensing member is urged to hold the blocking member in its non-blocking position, when a film cartridge is not loaded in the camera, to permit manual actuation of the shutter release for test-operation purposes. When the film cartridge is loaded in the camera, the cartridge sensing member is moved to release the blocking member for movement to its blocking position. A film motion detecting sprocket engageable with successive perforations in the filmstrip is rotated in a predetermined direction in response to advancement of the filmstrip as it is wound onto a take-up spool. The sprocket is coupled with the blocking member, preferably in coaxial relation, to pivot the blocking member back to its non-blocking position when the sprocket is rotated initially in the predetermined direction. If the sprocket is not rotated in the predetermined direction, the blocking member remains in its blocking position, thereby warning the user of a film take-up malfunction by preventing manual actuation of the shutter release.

6 Claims, 5 Drawing Figures

CAMERA WITH FILM TAKE-UP CONFIRMING MECHANISM

BACKGROUND OF THE INVENTION

1. Field of the Invention

The invention generally relates to photographic cameras. More particularly, the invention relates to a camera which, when loaded with a light-tight cartridge containing a filmstrip, warns the user of a film take-up malfunction by preventing manual actuation of the shutter release and, when not loaded with the cartridge, permits manual actuation of the shutter release to test-operate the camera.

2. Description of the Prior Art

To load most 35 mm cameras, the film cartridge is inserted in a loading chamber of the camera and the forward end portion of a film leader projecting from a light trapping slit in the cartridge is placed over a film take-up spool in a take-up chamber of the camera. In some cameras, the forward end portion of the film leader is manually attached to the take-up spool before a back door of the camera is closed. Then, an initial film winding operation is performed, for example, by pivoting a winding lever and depressing a shutter release button several times until the entire leader is wound onto the take-up spool and the first frame area of the filmstrip is positioned for exposure. In other cameras, the forward end portion of the film leader is automatically secured to the take-up spool at the beginning of the initial film winding operation. As the take-up spool is rotated, one or more circumferential teeth on the spool engage the forward end portion of the film leader in its perforations to wind the leader onto the spool and to position the first frame area of the filmstrip for exposure. A spring-like deflector or other suitable means may be provided on the back door of the camera for pressing the film leader against the take-up spool to facilitate engagement of the forward end portion of the leader by the teeth on the spool. After the first frame area of the filmstrip is exposed, subsequent exposures are made by repeating the film winding and shutter releasing operations.

A problem that exists in some 35 mm cameras as a consequence of the loading procedure is that, even though the user believes the forward end portion of the film leader is secured to the take-up spool, the forward end portion may fail to be engaged with the spool or may disengage from the spool during the initial film winding operation. As a result, the film leader will not be wound onto the take-up spool and the first frame area of the filmstrip cannot be positioned for exposure. However, since the back door of the camera is closed, the user may not become awary of the film take-up malfunction because the winding lever and the shutter release button can be manually operated in the usual way. The user, thus, under the delusion that the camera is working properly might begin photographing and would learn of the malfunction only when the back door of the camera is re-opened to remove the cartridge from the camera, thereby possibly losing certain picture opportunities.

A prior art solution to the problem is proposed in U.S. Pat. No. 3,665,830 granted May 30, 1972 to Maeda. In the Maeda patent, when a film cartridge is not loaded in the camera, the winding lever and the shutter release button can be manually operated in the usual way to test-operate the camera. This is desirable in order to demonstrate the camera to a customer in a store and to check the camera during manufacture. When a film cartridge is loaded in the camera, the shutter release button is locked, but the winding lever can be pivoted several times to wind the film leader onto the take-up spool and to position the first frame area of the filmstrip for exposure. The shutter release button is unlocked only in response to the occurrence of two events. First, a sensing lever normally in contact with the take-up spool is displaced from the spool by the first convolution of the film leader being wound onto the spool. Then, a counter dial is rotated to a position which indicates that the first frame area of the filmstrip is positioned for exposure. Thus, in the Maeda patent, there is disclosed a camera which, when loaded with a film cartridge, warns the user of a film take-up malfunction by preventing manual actuation of the shutter release button and, when not loaded with the cartridge, permits manual actuation of the shutter release button to test-operate the camera. However, this capability in the Maeda patent is achieved only by a relatively complex assemblage of a number of cams, levers and springs which significantly adds to the cost of manufacture of the camera and increases the possibility of a mechanical break-down.

SUMMARY OF THE INVENTION

The invention provides an improved camera, simplified in comparison to the prior art described above, which, when loaded with a film cartridge, warns the user of a film take-up malfunction by preventing manual actuation of a shutter release and, when not loaded with the cartridge, permits manual actuation of the shutter release to test-operate the camera.

According to the invention, a blocking member is urged to move from a non-blocking position with respect to a shutter release to a blocking position preventing actuation of the shutter release. A cartridge sensing member is urged to hold the blocking member in its non-blocking position, when a film cartridge is not loaded in the camera, to permit manual actuation of the shutter release for test-operation purposes. When the film cartridge is loaded in the camera, the cartridge sensing member is moved to release the blocking member for movement to its blocking position. A film motion detecting sprocket engageable with successive perforations in the filmstrip is rotated in a predetermined direction in response to advancement of the filmstrip as it is wound onto a take-up spool. The sprocket is coupled with the blocking member, preferably in coaxial relation, to pivot the blocking member back to its non-blocking position when the sprocket is rotated initially in the predetermined direction. If the sprocket is not rotated in the predetermined direction, the blocking member remains in its blocking position, thereby warning the user of a film take-up malfunction by preventing manual actuation of the shutter release.

BRIEF DESCRIPTION OF THE DRAWINGS

The invention will be described in connection with the drawings, wherein.

DESCRIPTION OF THE PREFERRED EMBODIMENT

The invention is disclosed as being embodied preferably in a 35 mm camera. Because the features of this type of camera are generaly well known, the description which follows is directed in particular to photographic elements forming part of or cooperating directly with the disclosed embodiment. It is understood, however, that other elements not specifically shown or described may take various forms known to persons of ordinary skill in the art.

Figure 1:
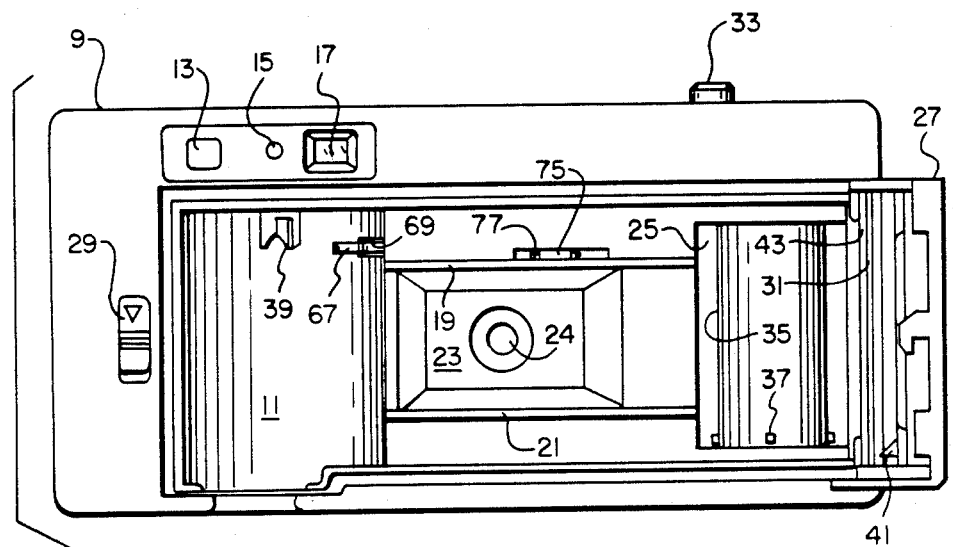
FIG. 1 is a rear elevation view of a 35 mm camera with its back door opened to receive a film cartridge having a film leader projecting from the cartridge.
Figure 1:
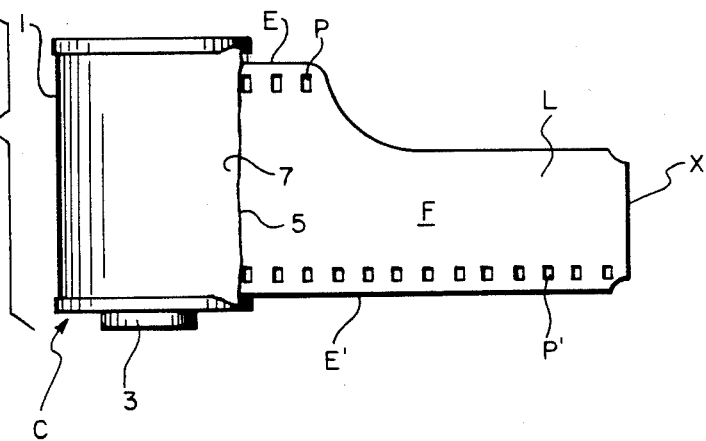

Referring now to the drawings and in particular to FIG. 1, a 35 mm camera is shown with its back door opened to receive a known film cartridge C, such as one manufactured by Eastman Kodak Company. The film cartridge C comprises a light-tight container 1 housing a rotatably supported spool 3 on which is wound an edge-perforated 35 mm filmstrip F. As viewed in FIG. 1, the filmstrip F has an upper row of perforations P adjacent a longitudinal edge E and a lower row of perforations P' adjacent a longitudinal edge E'. A leader section L of the filmstrip F projects from a plush-lined, light trapping slit 5 in a throat 7 of the cartridge C and has a forward end portion X whose width is approximately one-half of the width of the remainder of the filmstrip. The 35 mm camera includes a housing or body 9 on which is provided a number of known elements, such as a loading chamber 11 for receiving the cartridge C; a flesh ready lamp 13 for a built-in electronic flash, not shown; a low light warning lamp 15; a viewfinder window 17; a pair of substantially parallel film rails 19 and 21; a film exposure window 23; an objective lens 24; a film take-up chamber 25; a back door 27; a manually operable latch 29 for securing the back door closed; a pressure plate 31 spring-supported on the inside of the back door for holding successive frame areas of the filmstrip F flat on the pair of film rails during film exposure at the exposure window; and a shutter release button 33 manually depressible to initiate film exposure. A film take-up spool 35 is rotatably supported in the take-up chamber 25 and has a plurality of circumferentially spaced teeth 37 for engaging the forward end portion X of the film leader L in one or more of its perforations P' to secure the film leader to the spool, to wind the exposed film onto the spool. The take-up spool 35 may be rotated manually by pivoting a winding lever or rotating a thumbwheel, not shown, on the camera body 9 or it may be rotated automatically by a known motor drive, not shown, following each exposure of the filmstrip F. A film rewind shaft 39 is rotatably supported in the loading chamber 11 for engaging the film spool 3 on the cartridge C to rewind the exposed film back into the cartridge after exposure of the filmstrip F is complete.

Similar to the take-up spool 35, the rewind shaft 39 may be rotated manually or by a motor drive.

When the cartridge C is inserted in the loading chamber 11, the cartridge is positioned with its throat 7 pointing towards the take-up spool 35. Optimally, the forward end portion X of the film leader L is located with its perforations P' within reach of the teeth 37 on the take-up spool 35. In the event, however, the perforations P' are slightly askew of the teeth 37, a wedge 41 on the inside of the back door 27 is disposed to abut the longitudinal edge E' of the film leader L, when the door is closed, to move the leader widthwise until the perforations are within reach of the teeth. As the take-up spool 35 is rotated in a counter-clockwise direction, indicated by an arrow A in FIG. 4, one or more of the teeth 37 engage the forward end portion X of the film leader L in its perforations P' to wind the leader onto the spool and to position the first frame area of the filmstrip F in position for exposure at the window 23. A spring-like deflector 43, shown in FIG. 1 on the inside of the back door 27, is provided to press the forward end portion X of the film leader L against the take-up spool 35 to facilitate engagement of the forward end portion by one or more of the teeth 37.

A problem that exists in some prior art cameras as a consequence of the loading procedure is that, even though the user believes the forward end portion X of the film leader L is secured to the take-up spool, the forward end portion may fail to be engaged with the spool or may disengage from the spool during the initial film winding operation. As a result, the film leader will not be wound onto the take-up spool and the first frame area of the filmstrip cannot be positioned for exposure. However, since the back door of the camera is closed, the user may not become aware of the film take-up malfunction because the film winding lever and the shutter release button can be manually operated in the usual way. The user, thus, under the delusion that the camera is working properly might begin photographing and would learn of the malfunction only when the back door of the camera is re-opened to remove the cartridge from the camera, thereby possibly losing certain picture opportunities.

According to the invention, there is provided an improved camera which, when the cartridge C is received in the loading chamber 11, warns the user fo a film take-up malfunction by preventing manual actuation of the shutter release button 33 and, when the loading chamber is empty, permits manual actuation of the shutter release button to test-operate the camera. In the body 9 of the camera, a blocking member 45 is mounted on a pin 47 to pivot in opposite directions about the pin between a blocking position, shown in FIG. 4 (and in phantom in FIG. 5) and a non-blocking position, shown in FIG. 5. In the blocking position, the blocking member 45 is abutted against a stop 49 and a blocking portion 51 of the blocking member prevents depression of the shutter release button 33. In the non-blocking position, the blocking member 45 is abutted against a stop 53 and its blocking portion 51 is removed from the shutter release button 33. A helical tension spring 55 urges the blocking member 45 to pivot about the pin 47 from its non-blocking position to its blocking position. A cartridge sensing member 57 is supported by a pair of pins 59, extending through respective slots 61 in the sensing member, to translate in opposite directions along the pins between an extended position, shown in FIG. 2, and a retracted position, shown in FIGS. 4 and 5. In the extended position, a hook-like portion 63 of the sensing member 57 engages a corresponding portion 65 of the blocking member 45 to hold the blocking member in its non-blocking position and a feeler portion 67 of the sensing member protrudes into the loading chamber 11 through an opening 69 in a wall 71 of the loading chamber to sense that the chamber is empty. A helical tension spring 73, stronger than the spring 55 for the blocking member 45, normally maintains the sensing member 57 in its extended position. Thus, when the loading chamber 11 is empty, the blocking member 45 is held in its non-blocking position by virtue of the sensing member 57 being in its extended position, thereby permitting the shutter release button 33 to be manually actuated to test-operate the camera. However, when the cartridge C is inserted in the loading chamber 11, the feeler portion 67 of the sensing member 57 is moved by the cartridge into the opening 69. This translates the sensing member 57 along the pins 59 to its retracted position. In the retracted position, the hook-like portion 63 of the sensing member 57 is separated from the corresponding portion 65 of the blocking member 45 to permit the spring 55 to urge the blocking member to its blocking position.

Figure 2:
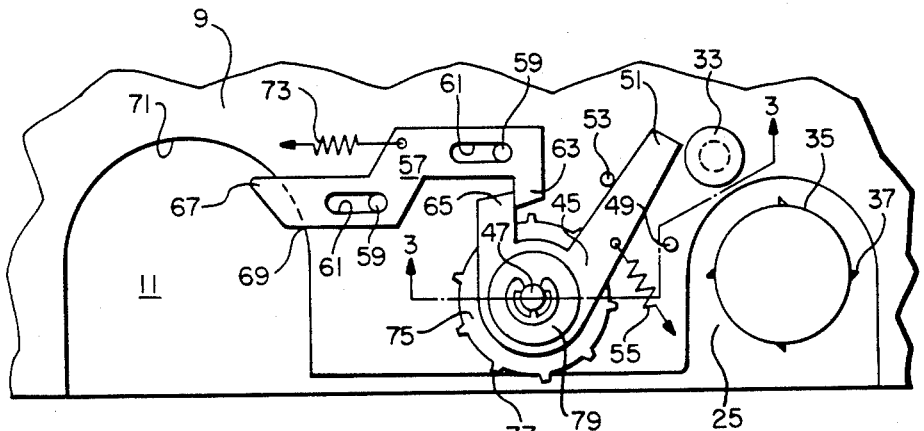
FIG. 2 is a top plan view of a film take-up confirming mechanism in the camera according to a preferred embodiment of the invention, depicting the mechanism when a film cartridge is not loaded in the camera.
Figure 3:
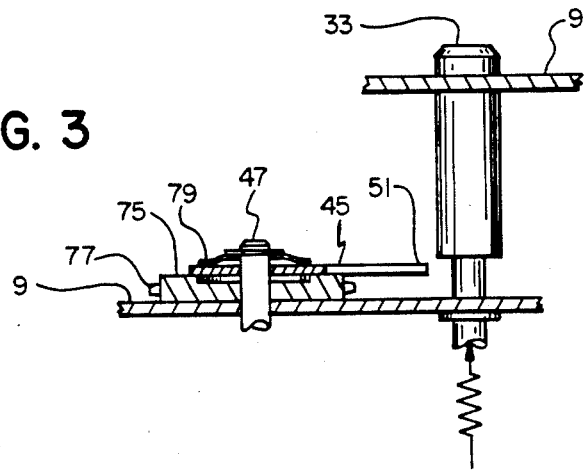
FIG. 3 is a sectional view of the film take-up confirming mechanism as seen in the direction of the arrows from the line 3—3 in FIG. 2.
Figure 4:
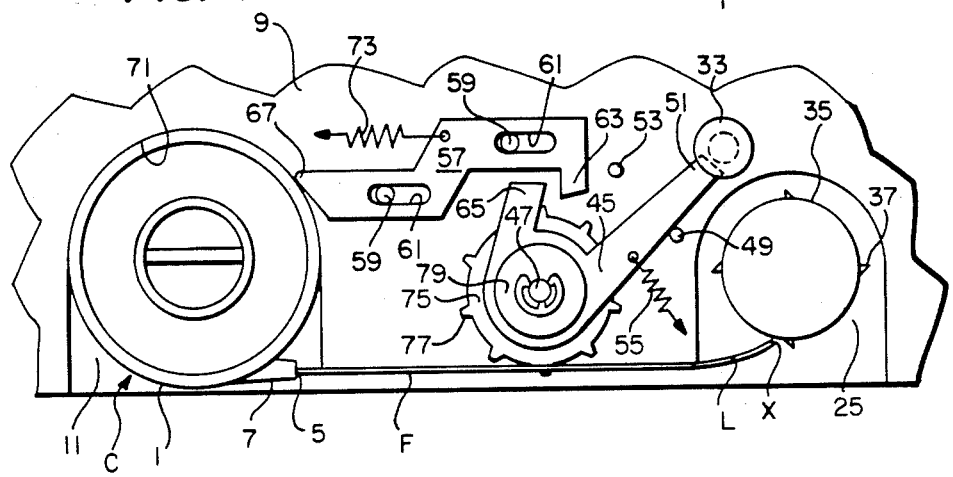
FIG. 4 is a top plan view of the film take-up confirming mechanism, depicting the mechanism when a cartridge is loaded in the camera but a film take-up failure has occurred.
Figure 5:
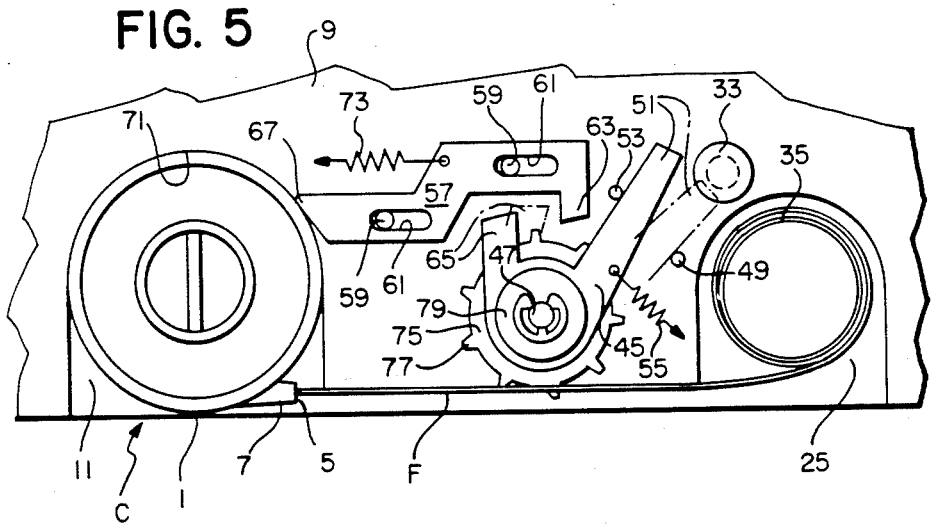
FIG. 5 is a top plan view of the film take-up confirming mechanism, depicting the mechanism when a cartridge is loaded in the camera and the initial film winding operation is satisfactorily completed.

A film motion detecting sprocket 75, shown in FIGS. 1 and 2, has peripheral teeth 77 engageable with the filmstrip F in the perforations P. The sprocket 75 is mounted for rotation about the pin 47 in a predetermined direction, indicated by an arrow B in FIG. 5, in response to advancement of the filmstrip F as the filmstrip is wound onto the take-up spool 35. A slipping clutch for operatively coupling the sprocket 75 and the blocking member 45 at the pin 47 is effected, as shown in FIG. 2, by a washer-like spring 79 which encircles the pin to urge the blocking member into frictional contact with the sprocket. When the sprocket 75 is rotated initially in the predetermined direction B in response to advancement of the filmstrip F as the film leader L is wound onto the take-up spool 35, the frictional contact between the sprocket and the blocking member 45 causes the blocking member to return to its non-blocking position, as shown in FIG. 5. Thereafter, as the filmstrip F is wound onto the take-up spool 35, the sprocket 75 rotates in the same direction, but in slipping relation to the blocking member 45. The resulting drag on the filmstrip F is relatively light. If the sprocket 75 is not rotated in the predetermined direction B because the forward end portion X of the film leader L has failed to be engaged in its perforations P' by one or more of the teeth 37 of the take-up spool, as shown in FIG. 4, the blocking member 45 remains in its blocking position, thereby warning the user of a film take-up malfunction by preventing manual actuation of the shutter release button 33.

The invention has been described with reference to a preferred embodiment, but it will be understood that various modifications may be effected within the ordinary skill in the art without departing from the scope of the invention.

I claim:

1. A improved photographic camera of the type adapted for use with a film cartridge containing a perforated filmstrip wherein (a) film take-up means takes up the filmstrip from the cartridge, (b) a film sprocket engageable with successive perforations in the filmstrip is rotated in a predetermined direction in response to the filmstrip being taken up by said take-up means, and (c) a shutter release is moved to initiate exposure of the filmstrip, and wherein the improvement comprises:
   means for preventing movement of said shutter release, said preventing means capable of being disabled to permit movement of the shutter release; and
   means operatively coupling said sprocket and said preventing means for disabling the preventing means in response to rotation of the sprocket in the predetermined direction, whereby when the sprocket is not rotated a warning will be provided of a film take-up malfunction by preventing movement of said shutter release.

2. The improvement as recited in claim 1, wherein said preventing means includes a preventing member supported for coaxial movement with said sprocket in the predetermined direction from a position preventing movement of said shutter release to a position permitting movement of the shutter release.

3. An improved photographic camera of the type wherein (a) a loading chamber receives a film cartridge containing a perforated filmstrip, (b) film take-up means takes-up the filmstrip from a film cartridge received in said loading chamber, (c) a film sprocket engageable with successive perforations in the filmstrip is rotated in a predetermined direction in response to the filmstrip being taken up by said take-up means, and (d) a shutter release is moved to initiate exposure of the filmstrip, and wherein the improvement comprises;
   blocking means urged to move from a non-blocking position with respect to said shutter release to a blocking position preventing movement of the shutter release;
   sensing means urged to hold said blocking means in its non-blocking position when a cartridge is not present in said loading chamber and releasing the blocking means for movement to its blocking position when a cartridge is loaded in the loading chamber; and
   means operatively coupling said sprocket and said blocking means for returning the blocking means to its non-blocking position in response to rotation of the sprocket in the predetermined direction, whereby when a cartridge is loaded in said loading chamber and said take-up means fails to take up the filmstrip said blocking means will prevent movement of said shutter release.

4. The improvement as recited in claim 3, wherein said blocking means includes a blocking member supported for pivotal movement between the blocking and non-blocking positions in coaxial relation with said sprocket.

5. The improvement as recited in claim 3, wherein said coupling means includes slipping clutch means initially for frictionally coupling said sprocket and said blocking member to return the blocking member to the non-blocking position in response to rotation of the sprocket in the predetermined direction and thereafter for allowing the sprocket to rotate relative to the blocking member in the same direction.

6. An improved photographic camera of the type wherein (a) a loading chamber receives a film cartridge containing a perforated filmstrip, (b) film take-up means takes-up the filmstrip from a film cartridge received in said loading chamber, (c) a film sprocket engageable with successive perforations in the filmstrip is rotated in a predetermined direction in response to the filmstrip being taken up by said take-up means, and (d) a shutter release is moved to initiate exposure of the filmstrip, and wherein the improvement comprises:

a blocking member urged to pivot from a non-blocking position with respect to said shutter release to a blocking position preventing movement of the shutter release;

a sensing member urged to extend into said loading chamber for sensing the absence of a cartridge in the chamber and to engage said blocking member in its blocking position for holding the blocking member in the blocking position, said sensing member being moved by a cartridge loaded in said loading chamber to disengage said blocking member to permit the blocking member to be urged to pivot to its blocking position; and means operatively coupling said sprocket and said blocking member in coaxial relation for pivoting the blocking member to return to its non-blocking position in response to rotation of the sprocket initially in the predetermined direction, whereby when a cartridge is loaded in said loading chamber and said take-up means fails to take up the filmstrip said blocking member will prevent movement of the shutter release.

* * * * *